Patented Sept. 3, 1940

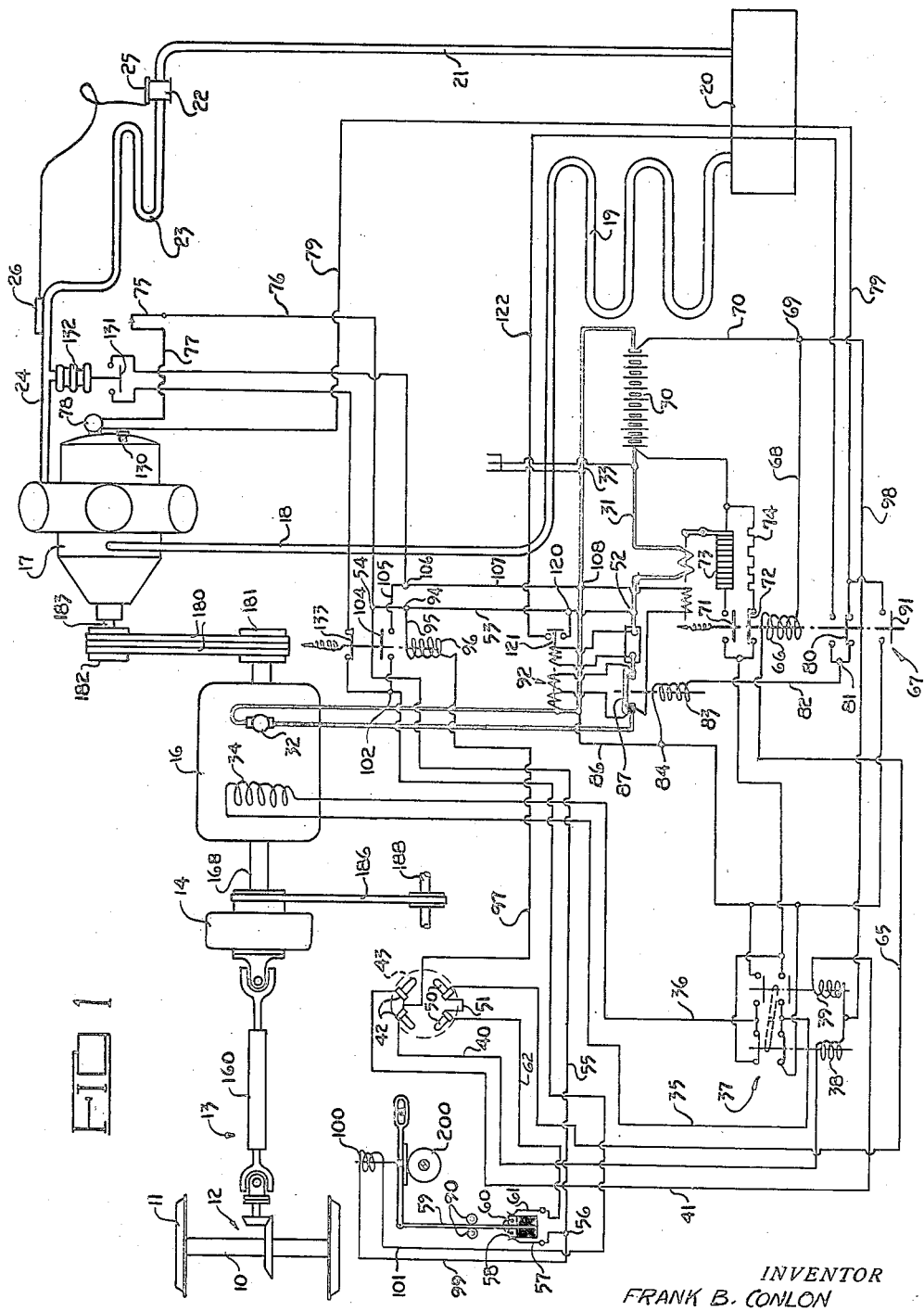

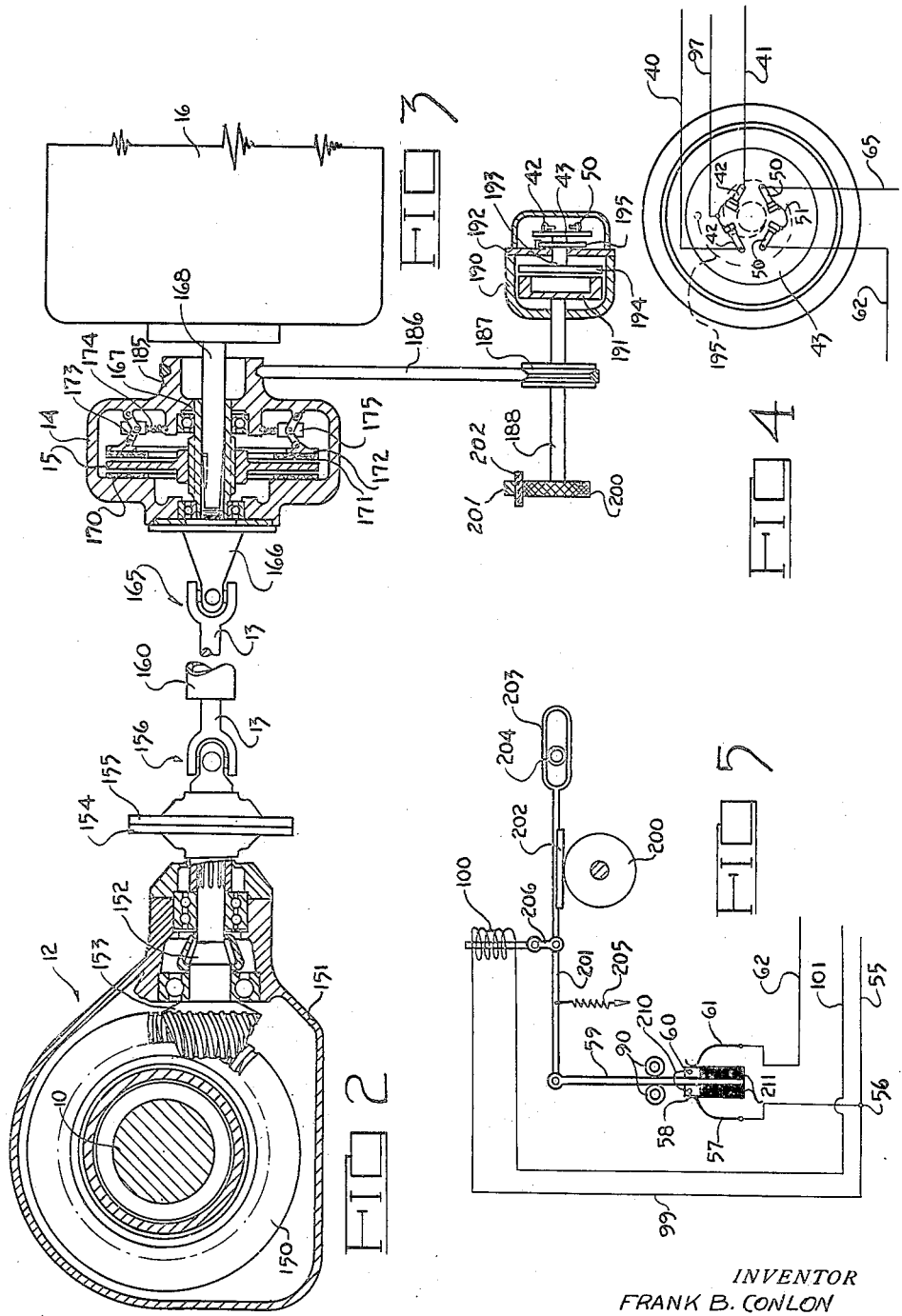

2,213,337

UNITED STATES PATENT OFFICE 2,213,337

RAILROAD AIR CONDITIONING CONTROL SYSTEM

Frank B. Conlon, Dayton, Ohio, assignor, by mesne assignments, to Chrysler Corporation, Highland Park, Mich., a corporation of Delaware Application December 8, 1937, Serial No. 178,715

8 Claims. (Cl. 62—6)

My present invention relates to a method and apparatus for conditioning the air in passenger vehicles, particularly railroad cars. The improvement is designed to simplify and to improve the type of apparatus comprising mechanical means for driving a refrigerant compressor from the axle of the vehicle, or electrical means for driving the refrigerant compressor, either from a wayside source, or especially from a battery charged by a generator carried by the car and driven by the axle of the vehicle when the vehicle is in motion. The principal object of the present invention is to devise apparatus whereby the operation of the refrigerant compressor by the electrical drive can occur only when the vehicle is stationary and whereby the motor is de-energized immediately upon the initiation of motion of the vehicle in either direction. The result of this apparatus is to prevent any possibility of the motor operating the compressor in one direction of rotation and having the axle drive tend to operate the compressor in the opposite direction of rotation before the mechanism comes to a complete stop after the motor is de-energized. Other objects and advantages of the present invention should be apparent from the following description of a preferred form of the invention taken in connection with the accompanying drawings wherein certain parts of the apparatus are presented in schematic fashion. In the drawings Fig. 1 sets forth the general arrangement of the apparatus comprising a mechanical driving means from the car axle through a centrifugal clutch and a shunt wound machine to the compressor, the refrigerating system, a speed and direction switch, a motion switch, and the electrical control circuit; Fig. 2 shows some details of a preferred form of axle gearing mechanism; Fig. 3 shows some details in schematic fashion of a preferred form of centrifugal clutch; Fig. 4 shows some details in schematic fashion of a preferred form of speed and direction switch; and Fig. 5 shows some details in schematic fashion of a preferred form of motion switch.

The drawings disclose a car axle 10 and car wheel 11, the axle being provided with a geared driving mechanism 12 of any standard type. The gears of the mechanism 12 operate a flexible, extensible shaft 13 of any suitable type which operates the driving element 14 of a centrifugal clutch. The gear drive, flexible shaft and centrifugal clutch may be obtained in the open market from the Spicer Manufacturing Corporation of Toledo, Ohio, but other types of driving mechanism such as belt drives and other types of centrifugal clutches may be substituted therefor without departing from the present invention. The clutch is preferably so designed and the gear ratios are such that the driven element 15 will be engaged and rotated when the vehicle arrives at some predetermined speed such as ten miles per hour, or if desired, at a higher speed such as approximately twenty-seven miles per hour, in order that the clutch shall only be engaged at the speed of rotation required to create full load voltage by a shunt-wound, variable speed machine 16, the armature of which is attached to and rotated by the driven member 15.

The armature of the shunt machine is connected to the crank shaft of a variable capacity compressor 17 such as is fully disclosed and claimed in the co-pending applications of Charles R. Neeson, Serial No. 177,694, filed December 2, 1937, and Charles R. Neeson and Frank B. Conlon, Serial No. 177,695, filed December 2, 1937, now Patent No. 2,185,473, issued January 2, 1940, and Patent No. 2,173,285, issued September 19, 1939, respectively. Refrigerant compressed by the compressor 17 is forced into a discharge pipe 18 which leads the hot compressed refrigerant into a condenser 19 from which cooled and liquefied refrigerant is discharged into a receiver 20. The operation of the compressor tends to draw liquid refrigerant from the receiver into a liquid line 21 which is partially obstructed by a variable orifice expansion valve 22 permitting the refrigerant to be expanded into the air conditioning evaporator 23 over which the air to be conditioned is passed in order to cool and dehumidify the same. The expanded refrigerant passes from the evaporator into a suction pipe 24 which leads the refrigerant back to the compressor from which it is again discharged through the refrigerating system. The size of orifice in the valve 22 is controlled by a motor 25 operated by pressure created in a thermostatic fluid filled bulb 26 placed in heat transferring relationship with the suction pipe 24 so that the amount of refrigerant admitted to the evaporator is controlled by the superheat of the expanded refrigerant, which in turn is controlled by the load upon the evaporator. The compressor, as explained in the foregoing applications, has a variable capacity under control of the pressure of the expanded refrigerant which is a reflection of the load on the compressor and is also affected by the speed of the compressor so that the compressor tends to deliver the proper amount of refrigerant to take care of the load regardless of the speed at which it operates. The compressor may be operated at a constant speed by the shunt machine acting as a motor when the car is standing still, and will operate at a variable speed depending upon the speed of the vehicle after the clutch has been engaged subsequent to the first motion of the car. It is desired with the present invention to have the compressor inoperative from the instant of first motion of the car until the car has attained sufficient speed to cause the centrifugal clutch to become engaged. This permits the compressor as well as the armature of the shunt machine to come to a full stop before the axle driven mechanical drive becomes operative, whereby damage to the mechanism is rendered impossible. The relatively short periods of time when the compressor is inoperative have very little effect upon the efficient performance of the air conditioning system since most passenger trains accelerate and de-accelerate at the rate of one mile per second per second, so that if the clutch is designed to engage at fifteen miles per hour the air conditioning will be stopped, under most circumstances, for a period of only 15 seconds. It is, of course, conceivable that the train may proceed at a low speed for some period of time, but a careful study of passenger train schedules discloses that these instances are very rare. Passenger train schedules, however, do seem to indicate that the preferred type of clutch is one which will engage at about fifteen miles per hour in order that the compressor may be driven thereby even though the shunt machine may not be rendered operative until the vehicle attains the speed of twenty-seven miles per hour. Some of the foregoing principal features of the operation of this system are more fully disclosed in the aforementioned application of myself and Charles R. Neeson.

Having described the principal features of the present invention there follows a description of a simplified electrical circuit whereby the objects of the present invention are achieved. Fig. 1 discloses a main power circuit for the shunt machine 16 comprising a battery 30 mounted upon the body of the vehicle from which main line 31 leads to the armature 32, the circuit being completed by main line 33 back to battery. The shunt field 34 is connected by wires 35 and 36 to a self-maintaining field reversing relay 37 which is adapted to reverse the direction of field flux in order to set up the machine to operate properly as a generator in accordance with the direction of movement of the vehicle. The relay 37 is actuated by solenoids 38 and 39 connected by wires 40 and 41 to a pair of mercury tube contactors 42 mounted upon the disk 43 of a speed and direction switch. If the disk 43 is rotated in clockwise direction one of the solenoids 38 or 39 will be energized to set the field current in one direction, and if the disk 43 is rotated counterclockwise the other relay will be energized to set the field current in the opposite direction.

The disk 43, as will be explained later, is so mounted that the lower pair of mercury tube contactors 50, which are connected in series by wire 51, will be closed when the car is stationary or moving at a very low speed. These tubes close a circuit from battery 30 through wire 31 to junction 52, through wire 53 to junction 54, through wire 55 to junction 56, to resilient contactor 57. The resilient contactor 57 normally rests upon a contact block 58 carried by an arm 59 of the motion switch. Current may then flow through contact block 58, arm 59 to contact block 60, also mounted upon arm 59, to a second resilient contactor 61 which is connected by wire 62 to the mercury tubes 50. From the mercury tubes a wire 65 leads to solenoid 66 of control relay 67, the circuit being completed by wire 68 to junction 69, and wire 70 back to battery. Thus if the car is standing still, contact is made at 50, 58 and 60 to energize relay 67. Energizing of the relay 67 pulls armature 71 which is normally in upper position due to the tension of a spring from its contacts and causes armature 72 to close its contacts thereby transferring the positive circuit from the carbon pile regulator 73 to the motoring resistor 74. Relay 37, which is self-maintaining in either position has set up field connections for proper rotation of the shunt machine armature in either direction. If cooling is required in the vehicle as indicated by thermostat 75, a circuit will be completed from junction 54 through wire 76, thermostat 75, wire 77, the solenoid of a solenoid valve 78, wire 79, through armature 80 to junction 81, wire 82, solenoid 83 to junction 84, and wire 86 to negative side of the battery, thus causing solenoid 83 to close the normally open main contactor 87 and starting the shunt machine as a motor. If thermostat 75 opens the solenoid 83 is de-energized thereby stopping the motoring action.

As soon as the train starts to move in either direction a means provided in the motion switch senses the beginning of motion and causes lever 59 to be rocked in either direction about the roller pivots 90, thereby causing the contact block 60 to break from contactor 61, or the contact block 58 to break from contactor 57, depending upon the direction of motion. This opens the circuit from junction 56 through the mercury tubes 50 to the solenoid 66 of relay 67, allowing relay 67 to close contacts through armature 71, the upper pair of contacts engageable by armature 80, and a pair of contacts engageable by armature 91, opening the circuit through wire 79 and preventing the control of solenoid 83 by thermostat 75, opening the motor resistor and motoring field connections and closing the connections to the carbon pile regulator 73. Armature 80 transfers the control of solenoid 83 from the thermostat 75 to control by the reverse current relay 92, and armature 91 places the solenoid of solenoid valve 78 under direct control of the thermostat 75 again.

As the speed of the train increases, either the counterclockwise or clockwise rotation of disk 43 places one or the other of the mercury tube contactors 42 in contact, completing a circuit from battery to junction 52, through wire 53 to junction 94, through wire 95 to solenoid 96, through wire 97 to one of the mercury tube contactors 42, through wire 40 or 41, as the case may be, to solenoid 38 or 39, respectively, through wire 98 to junction 69, and wire 70 back to battery. This sets up the proper field direction for generating corresponding to the direction of the train. The relay 96 upon being energized completes a circuit from junction 52 through wire 53, junction 54, wire 55, junction 56, wire 99, solenoid 100, wire 101, junction 102, armature 104, wire 105, junction 106, wire 107, junction 108, and wire 33 back to negative side of the battery, thus energizing the solenoid 100 which raises the lever 59, pulling contact blocks 58 and 60 away from fingers 57 and 61 so that no circuit can be completed through the motion switch, thus preventing the actuation or tendency toward actuation of the shunt machine as a motor.

As the speed further increases the centrifugal clutch 14—15 cuts in thereby starting rotation of the armature 32 and compressor 17. As the open circuit voltage of the generator increases above the battery voltage, the relay 92 closes a circuit from junction 120 through armature 121, wire 122, upper contacts engaged by armature 80, junction 81, wire 82, solenoid 83, junction 84 and wire 86 back to battery, closing the main contactor 87 and permitting the shunt machine to generate. As the speed increases further the terminal voltage of the generator tends to increase and the solenoids of carbon pile regulator 73 act to increase the resistance in the carbon piles, thus acting to reduce the field strength of the machine and to hold the same to the desired operating range.

During the running position above the cut-in speeds of the clutch, the compressor 17 is directly connected to the mechanical driving means including the car axle and the output of the compressor is controlled by the individual cylinder unloading mechanism described in the aforementioned co-pending applications and by the action of thermostat 75 on the solenoid valve 78. As cooling is required, thermostat 75 closes a circuit from junction 52 to junction 54, to thermostat 75, to solenoid 78, to armature 80 and armature 91 to junction 84, thus energizing the solenoid of solenoid valve 78 and opening the oil pressure line to the master valve mechanism indicated at 130, further details of which may be ascertained from the aforesaid applications. When the master valve is under oil pressure, it senses the suction pressure and automatically controls the number of cylinders in operation and, hence, varies the capacity of the compressor. If no cooling is desired the thermostat 75 breaks, de-energizing the solenoid of solenoid valve 78 and unloading the compressor completely.

A pressure-responsive switch 131 is actuated by a bellows 132 subject to the suction pressure of the refrigerating system so that when the compressor is normally operating and the suction pressure is around a normal 40 lbs. per square inch, the switch 131 will close its contacts due to contraction of bellows 132. This completes a circuit from junction 52 to junction 54, to junction 56, solenoid 100, armature 133 provided relay 96 is de-energized, switch 131, junction 106, and junction 108 back to battery, thus energizing solenoid 100. Therefore, when the train is coming to a stop and the pressure in the suction side of the system is at or near the normal pressure, the motion switch contacts 57—58, 60—61 are held open and motoring is prevented until the compressor actually comes to a stop, and through the removal of oil pressure the unloader operates to lift the suction valves of the compressor causing the gas pressures in the system to equalize at or about 90 lbs. per square inch. When this happens, the bellows 132 expands, opening the holding circuit of solenoid 100 and allowing contacts 57—58, 60—61 to close and prepare the circuit for motoring as described previously. Relay 96 will have opened due to the coming to a standstill in center position of the speed and direction switch disk 43, thus removing the interlocking holdout circuit for the solenoid 100.

In Fig. 2 some details of a preferred form of mechanical driving means are shown, the same comprising a helical gear 150 fixed to the axle 10 and enclosed within a housing 151. The housing supports bearings in which is journaled a stub shaft 152 carrying a helical pinion gear 153 which is rotated by the gear 150. The stub shaft 152 is fixed to a coupling member 154 which is fastened to a complementary coupling member 155 carrying part of an universal joint 156 to which is fastened the shaft 13. The shaft 13 preferably comprises an extensible portion 160 in order that the swaying of the car and angularity of the car with respect to the axle truck when the train is rounding curves may be accommodated.

Fig. 3 shows the principal elements of a preferred form of centrifugal clutch. In the figure the shaft 13 is connected to an universal joint 165 to which is fastened a coupling member 166 carrying the driven member 14 of the clutch. The member 14 is preferably formed as a housing for the remainder of the clutch mechanism and carries bearings which journal a splined collar 167 keyed to a shaft 168 which carries the armature of the shunt machine 16. The driven member 15 of the centrifugal clutch is mounted upon the splined collar 167 so as to be positively rotated in unison therewith, but capable of longitudinal movement axially of the shaft 168. The housing 14 carries a clutch shoe 170 which is in position to engage one face of the driven member 15 and an opposed clutch shoe 171 carried by a floating ring 172 in position to engage the opposite face of the driven member 15. The floating ring is supported by a series of toggles 173 and springs 174. The springs are fastened to an inner portion of the driving member 14 and their other ends are fastened to a series of weights 175 carried by the central pivots of the toggles 173. The housing 14 will be driven at a speed varying in proportion to the speed of the car and at a certain speed of the car such as 15 or 20 miles per hour, the centrifugal force exerted upon the weights 175 will straighten the toggles 173 to such an extent as to cause the brake shoes 170 and 171 to grip the driven member 15 with sufficient force to rotate the armature of the shunt machine and to operate the compressor which is mechanically fastened to the opposite end of the shaft 168. As seen in Fig. 1, one manner of connecting the compressor and shunt machine is by means of belts 180 passing about a pulley 181 on shaft 168 and a pulley 182 on the crank shaft 183 of the compressor.

In order to operate the previously mentioned speed and direction switch and the motion switch, there is preferably provided an extension 185 of the driving member 14 which is grooved to form a pulley about which is passed a belt 186 extending to a pulley 187 on a control shaft 188. The control shaft 188 is therefore rotated immediately upon the initiation of movement of the car axle in either direction, the ratios of gearing and pulley sizes being preferably such as to cause the control shaft to rotate many times for each rotation of the car axle.

The speed and direction switch is designed to have a limited movement in a clockwise or counterclockwise direction, which is accomplished by the following mechanism: The shaft 188 extends into a housing 190 and carries a permanent magnet 191. The housing 190 supports a bearing plate 192 which journals a shaft 193 carrying a drag disk 194 positioned close to the permanent magnet 191 so as to be influenced thereby. The magnetic flux is not strong enough to rotate the drag disk as soon as movement commences, but at a certain car speed, such as 10 or 15 miles per hour, the magnetic force will be sufficient to rotate the drag disk 194 in either direction through an angle of 30° to 45°, by way of example, against the tension of a spiral spring 195 fastened at one end of the bearing plate 192 and at the other end to the shaft 193. The spring normally tends to retain the disk 194 in a normal position, but will permit the rotation thereof to a certain extent in either direction. The opposite end of shaft 193 carries the disk 43, in the upper quadrants of which are mounted the mercury tube contactors 42 which control the field reversing relay 37, and in the lower quadrants of which are mounted the mercury tube contactors 50 which permit the operation of the shunt machine as a motor. The upper mercury tubes 42 are connected in parallel with wire 97 extending from the common connection and with wires 40 and 41 extending to the solenoids 38 and 39 respectively of the field reversing relay. The mercury tubes 42 are so positioned as to be normally open and to require the rotation of the drag disk 194 through substantial angle in order that one or the other may make contact, thereby preventing the vibration and jolting of the car from giving false field indications. The lower mercury tube contactors 50 are placed in series with wire 65, wire 51 joining the two tubes and wire 62 leading to the motion switch contactor 61. The mercury tube contactors 50 are designed and so positioned as to be normally closed and are angularly mounted so as to require the rotation of the drag disk 194 through a substantial angle before one or the other breaks the circuit in which they are placed. The mercury tubes 50 act as safety devices for preventing any possibility of motoring tendencies in the shunt machine when the car is travelling above a predetermined speed.

The opposite end of shaft 188 carries a friction wheel 200 which is rotated in either direction immediately upon the initiation of car movement. The motion switch arm 59 is pivoted to a lever 201 carrying a friction pad 202 which normally rests upon the surface of the friction wheel 200 when the car is stationary. The opposite end of the lever 201 is guided by a yoke 203 embracing a guide roller 204 so that the arm 201 is free to move a short distance in either direction, which will happen when the friction wheel 200 is rotated in either direction. A spring 205 urges the friction pad 202 against the friction wheel in order to insure more positive action, and the spring is so placed as to cause the arm normally to maintain a central position, as shown in Fig. 5, when the friction wheel 200 is stationary. A link 206 connects lever 201 to the armature of solenoid 100, the link permitting longitudinal movement of the lever in either direction so that the solenoid does not interfere with the action of the lever unless it is energized. The spring contacts 57 and 61 normally engage the contact blocks 58 and 60, respectively, which are connected in series as by means of a wire 210 so that when the car is stationary, a circuit may be completed from junction 56 to wire 62 as previously explained. The initiation of car movement in either direction causes arm 59 to be rocked about the pivot provided by rollers 90 so as to break contact either between 57 and 58, or between 60 and 61, so that the circuit from junction 56 to wire 62 is broken immediately upon the first movement of the car, and the circuit will be held open due to the frictional contact of the rotating friction wheel 200 and the friction pad 202. When the car has achieved a certain speed as previously described, a circuit will be completed through solenoid 100 which, through the link 206, raises the motion switch arm 59 and lever 201 thereby separating the friction wheel and friction pad and placing contacts 57 and 61 against insulating blocks 211, and opening the circuit from junction 56 to wire 62. The solenoid 100 remains energized as long as the car is travelling above a certain speed, thereby preventing any possibility of car vibration and jolting from making the circuit to the motoring connections, and also preventing the high speed of rotation of friction wheel 200 from burning the friction pad 202. It can be seen that the friction wheel and friction pad are means for opening the motoring circuit immediately upon the initiation of car movement, and that the solenoid 100 merely acts as a safety device to prevent the completion of a motoring circuit while the car is moving, and also acts as a protection against self-destruction of the motion switch.

The operation of the mechanism is as follows: If the car is stationary the solenoid 100 is de-energized, the spring 195 is holding the disk 194 in normal position, mercury tube contactors 42 are both open and mercury tube contactors 50 are both closed, the friction pad 202 is resting on the friction wheel 200, and the motoring circuit is completed through resilient contacts 57 and 61. The shunt machine now acts as a motor to operate the compressor whenever the thermostat 75 indicates that cooling is desired and energizes solenoid 83. The normal operation of the compressor and the expansion valve 22 results in the maintenance of substantially low pressures in suction pipe 24 thereby causing the switch 131 to be closed and switch 133 is held open. The action of the master valve mechanism 130 is to control the number of cylinders in operation, thereby determining the amount of refrigerant passed into the evaporator in accordance with the load within the car, and when sufficient cooling has been accomplished, the thermostat 75 will open causing relay 83 to open and the motor to stop. If further cooling is desired and the car is still stationary, thermostat 75 will close opening the solenoid valve 78 and completing the motoring circuit, causing the shunt machine again to operate the compressor.

If the car now moves in either direction, the motion switch will open the circuit through wire 62, thereby breaking the motoring circuit immediately upon the initiation of movement and permitting the machine to have sufficient time to come to a complete stop before it is connected to the axle by the centrifugal clutch. Continued rotation of the driven member 14 causes the magnet 191 to accumulate sufficient speed at, for example, a car speed of two miles per hour to rotate the disk 43 through an angle sufficient to open one or the other of the mercury tube contactors 50, and to close one or the other of the mercury tube contactors 42. The direction of field in the shunt machine is thereby determined so that the shunt machine is now prepared to act as a generator when the car is travelling at sufficient speed, the solenoid 100 is energized to lift motion switch arm 59, which results in the positive prevention of motoring contacts being made, the solenoid 96 is energized to remove switch 131 from any control circuit, and the compressor is prepared to operate solely under control of the thermostat 75 and solenoid 78. At a certain higher speed, such as ten miles per hour, the clutch engages and the compressor is operated through the mechanical driving means. If cooling is demanded, the thermostat closes, opening the solenoid valve 78 and permitting the loading of the compressor. As long as the clutch is cut in, the compressor can operate at a variable speed, the capacity of the compressor being controlled by the master valve 130, and if no cooling is desired, the solenoid 78 will close thereby completely unloading the compressor even though the crank shaft is still operating the pistons. When the car has achieved a speed such that the open circuit voltage of the generator increases above the battery voltage, the main contactor 87 is closed by relays 92 and 83 and the shunt machine operates as a generator to charge the battery. When the car slows down to such an extent that the battery voltage exceeds the open circuit voltage of the shunt machine, the main contactor 87 is opened and the shunt machine becomes inoperative even though the armature still rotates and drives the compressor crank shaft. When the car slows still further, the compressor may not be rotated fast enough to generate sufficient oil pressure (as explained in the aforementioned application) to overcome the unloading means, with the result that the compressor becomes unloaded. Bellows 132 expands thereby opening the switch 131 which would de-energize the solenoid 100 were it not for the existence of armature 133 which is held in open position as long as relay 96 is energized. Upon further slowing of the car the clutch becomes disengaged thereby stopping the compressor entirely. At a low car speed disk 43 returns to normal position opening the contactors 42 and closing contactors 50 and relay 96 is de-energized to open 104 and close 133. High pressure in pipe 24 now opens switch 131 which de-energizes solenoid 100, permitting arm 59 to drop. As long as the car continues to move at all, the motoring circuit will be held open by the friction wheel 200, but as soon as the car comes to a complete stop, the spring 205 will return the arm 59 to its central position and the shunt machine will be prepared to act as a motor. If the thermostat 75 is closed, the compressor will immediately be operated by the electrical driving means.

Having described a preferred embodiment of my invention, it should be readily apparent to those skilled in the art that modifications in arrangement and detail thereof may be made without departing from the spirit of the invention as expressed in the following claims.

I claim:

1. An air conditioning system for a railroad car comprising a refrigerant compressor and a refrigerating system connected to said compressor for transferring heat from the interior to the exterior of the car through the action of said compressor and system, a shunt machine connected to said compressor, mechanical driving means deriving motion from the car axle, a speed-responsive clutch interposed between said mechanical driving means and said shunt machine for operating the compressor when the car is travelling above the cut-in speed of the clutch, means to cause said shunt machine to act as a motor to drive the compressor when the car is stationary, means responsive to movement of the car to deenergize said shunt machine and to prepare the same to act as a generator when the car has attained sufficient speed to cause the machine to generate, and means responsive to the suction pressure of the refrigerating system to prepare said shunt machine to act as a motor when the vehicle decelerates to a speed below the cut-in speed of said clutch.

2. An air conditioning system for a railroad car comprising a refrigerant compressor and a refrigerating system connected to said compressor for transferring heat from the interior to the exterior of the car through the action of said compressor and system, a shunt machine connected to said compressor, mechanical driving means deriving motion from the car axle, a speed-responsive clutch interposed between said mechanical driving means and said shunt machine for operating the compressor when the car is travelling above the cut-in speed of the clutch, means to cause said shunt machine to act as a motor to drive the compressor when the car is stationary, means responsive to movement of the car to deenergize said shunt machine and to prepare the same to act as a generator when the car has attained sufficient speed to cause the machine to generate, means responsive to the suction pressure of the refrigerating system to prepare said shunt machine to act as a motor when the vehicle decelerates to a speed below the cut-in speed of said clutch, and means to prevent the operation of said shunt machine as a motor until the car comes to a complete stop.

3. An air conditioning system for a railroad car comprising a refrigerant compressor, electrical driving means on the car to drive said compressor when the car is stationary, axle-driven mechanical driving means on the car to drive said compressor when the car is moving, and means to prevent the operation of said compressor by either of said driving means during movement of the car at any speed below a predetermined relatively low speed, said last means comprising a control circuit including a motion switch responsive to movement of the car in either direction.

4. An air conditioning system for a railroad car comprising a refrigerant compressor, electrical driving means on the car to drive said compressor when the car is stationary, axle-driven mechanical driving means on the car to drive said compressor when the car is moving, and means to prevent the operation of said compressor by either of said driving means during movement of the car at any speed below a predetermined relatively low speed, said last means comprising a control circuit including a motion switch responsive to movement of the car in either direction, said motion switch including a friction wheel continuously rotating during movement of the car and a switch arm frictionally operated by movement of said wheel in either direction.

5. An air conditioning system for a railroad car comprising a refrigerant compressor, electrical driving means on the car to drive said compressor when the car is stationary, axle-driven mechanical driving means on the car to drive said compressor when the car is moving, and means to prevent the operation of said compressor by either of said driving means during movement of the car at any speed below a predetermined relatively low speed, said last means comprising a control circuit including a motion switch responsive to movement of the car in either direction, said motion switch including a friction wheel continuously rotating during movement of the car, a switch arm frictionally operated by movement of said wheel in either direction, and means to separate said friction arm and said friction wheel during movement of the car above a predetermined relatively low speed.

6. An air conditioning system for a railroad car comprising a refrigerant compressor, electrical driving means comprising a battery on the car and a shunt machine on the car acting as a motor driven by current from the battery to drive said compressor when the car is stationary, axle-driven mechanical driving means on the car comprising a centrifugal clutch to drive said compressor and the armature of said shunt machine when the car is moving above the cut-in speed of the clutch, and means to prevent the operation of said compressor by either of said driving means during movement of the car at any speed below a predetermined relatively low speed, said last means comprising a control circuit including a motion switch responsive to movement of the car in either direction and a direction switch responsive to movement of the car in either direction to set up proper field current in said shunt machine to cause said shunt machine to be capable of charging said battery in either direction of movement of the car.

7. An air conditioning system for a railroad car comprising a refrigerant compressor, electrical driving means comprising a battery on the car and a shunt machine on the car acting as a motor to drive said compressor when the car is stationary, axle driven mechanical driving means on the car comprising a centrifugal clutch to drive said compressor and the armature of said shunt machine when the car is moving above the cut-in speed of the clutch, means to prevent the operation of said compressor by either of said driving means during movement of the car at any speed below a predetermined relatively low speed, said last means comprising a control circuit including a motion switch responsive to movement of the car in either direction and a direction switch responsive to movement of the car in either direction to set up proper field current in said shunt machine to cause said shunt machine to be capable of charging said battery in either direction of movement of the car, and means associated with said direction switch to prevent the actuation of said shunt machine as a motor when the same is prepared to act as a generator during movement of the car.

8. In combination with a railroad car, a shunt machine adapted to act either as a motor or as a generator, means to control said shunt machine to act as a constant speed motor when the car is stationary, a motion switch responsive to movement of the car to stop the action of said shunt machine as a motor, a direction switch comprising a magnetic drag device adapted to rotate in either direction in accordance with the direction of movement of the car to set the direction of field current in said shunt machine corresponding to the direction of movement of the car at a relatively low car speed in order to prepare said shunt machine to act as a generator at a higher speed, a battery carried by the car for operating said shunt machine as a motor, and means responsive to the open-circuit voltage of the generator to cause the same to charge said battery during movement of the car above a speed sufficient to generate full-load, open-circuit voltage.

FRANK B. CONLON.